April 29, 1952     H. B. WHITE     2,594,528
TOASTING MECHANISM

Filed July 13, 1948     3 Sheets-Sheet 1

INVENTOR.
*Harry B. White*
BY
*Harry S. Dumars*
ATTORNEY.

April 29, 1952  H. B. WHITE  2,594,528
TOASTING MECHANISM
Filed July 13, 1948  3 Sheets-Sheet 2

INVENTOR.
Harry B. White
BY
Harry S. Dumars
ATTORNEY.

April 29, 1952  H. B. WHITE  2,594,528
TOASTING MECHANISM
Filed July 13, 1948  3 Sheets-Sheet 3

INVENTOR.
Harry B. White
BY
Harry S. Ducarse
ATTORNEY.

Patented Apr. 29, 1952

2,594,528

UNITED STATES PATENT OFFICE 2,594,528

TOASTING MECHANISM

Harry B. White, Canton, Ohio, assignor to The Hoover Company, North Canton, Ohio, a corporation of Ohio Application July 13, 1948, Serial No. 38,532

11 Claims. (Cl. 161—1)

The present invention relates to the art of cooking devices and particularly to a bread toaster provided with a unique timing control mechanism.

It has been common experience in this art that toasting timing devices present a difficult design problem to produce toast of uniform quality in closely succeeding toasting periods. Due to the residual heat of the oven and the gradual rise in the initial oven temperature as the toasting mechanism is repeatedly used, the period required to produce toast of any given uniform color or degree of brownness progressively shortens. Conventional types of thermostatic timers are necessarily subjected to the ambient temperature in the toaster and by themselves tend to shorten up succeeding toasting periods to too great an extent unless modified by complicated and difficult to control special cooling mechanisms or compensating thermostatic construction.

It is a principal object of the present invention to provide a toast timing control mechanism which is simple in construction, reliable in operation, economical to manufacture and which inherently compensates within itself for the varying ambient conditions within the toaster and for alterations in the temperature or time deviation characteristics of the thermostat as the average temperature increases during sequential toasting periods.

It is a particular object of the present invention to provide a timing mechanism for a toaster in which the thermostatic elements of the timer always begin the timing movement from a substantially fixed point independently of the temperature conditions and which compensates to shorten sequential toasting periods by requiring different degrees of movement from the fixed starting point for the purpose of terminating the toasting period.

It is a further object of the present invention to provide a toast timing mechanism in which the active element thereof alters its degree of movement to compensate for varying ambient conditions in the toasting oven and which also sets a linkage mechanism to compensate the mechanical part of the release mechanism for the varying degree of movement of the timing element per se.

Other objects and advantages of the invention will become apparent as the description proceeds when taken in connection with the accompanying drawings in which.

Figure 1:
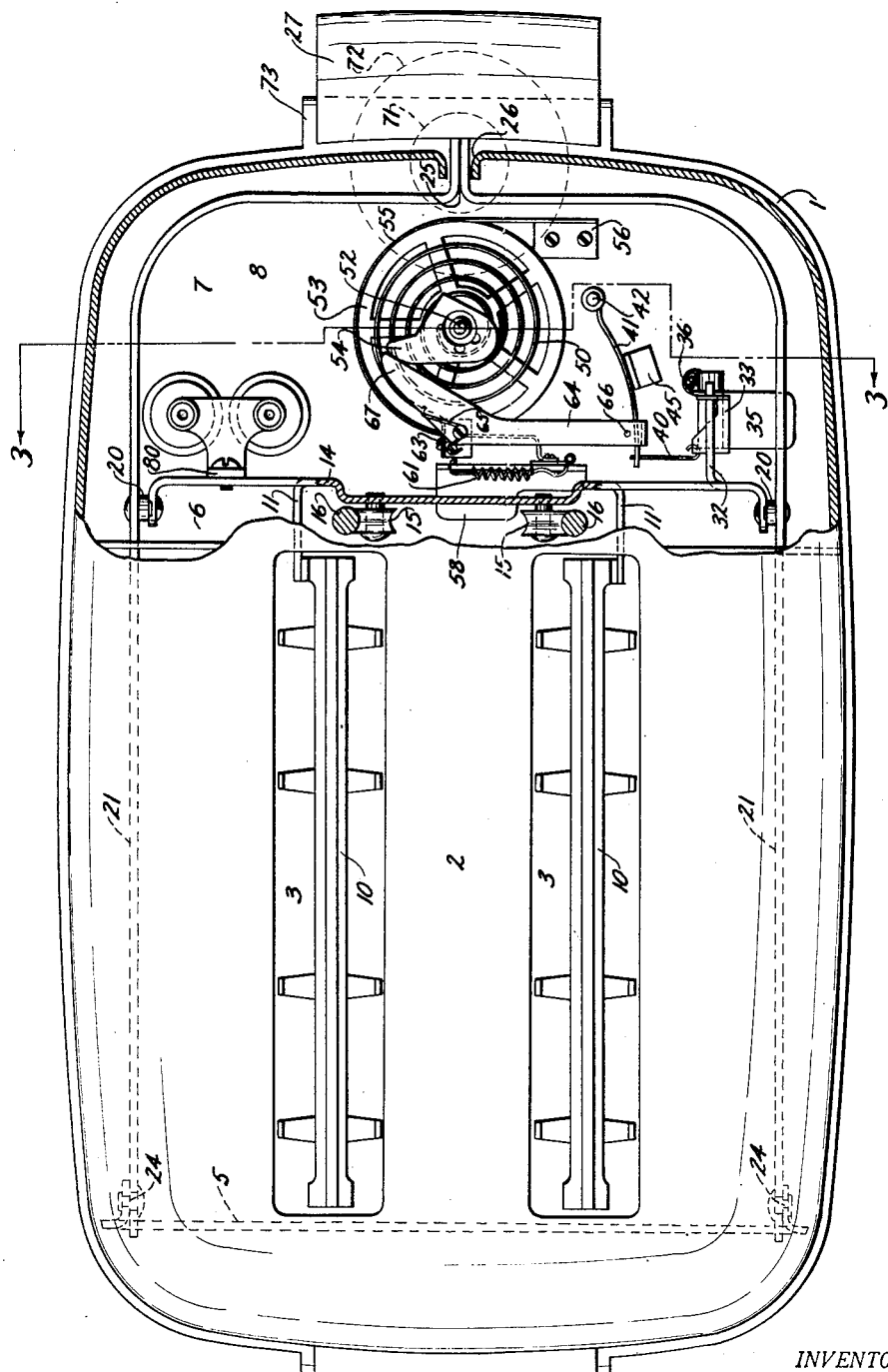
Figure 1 is a plane view with parts broken away to disclose the interior construction of a toasting mechanism embodying the present invention.

Referring now to the drawing in detail, the toasting mechanism comprises a base frame 1 of plastic or other suitable material which supports an outer casing or shell 2 housing the toasting oven 3. Suitable electrical heating elements indicated at 4 are provided within the housing 2 to provide heat for the oven 3. Internal vertical partitions 5 and 6 define the rear and front end walls, respectively, of the toasting oven. The end wall 6 at the front of the toasting oven 3 is spaced an appreciable distance from the corresponding end wall of the shell 2 to define a control mechanism chamber 7 between the wall 6 and the cover shell 2. A partition plate 8 extending through substantially the entire extent of the toaster somewhat below the plane at which the casing elements 1 and 2 are joined forms a common bottom wall for the toasting oven 3 and the control chamber 7.

Toast supporting racks 10 are positioned within the oven 3 and are carried by rigid bracket elements 11 which project into the control chamber 7 through vertical slots 12 in the partition wall 6. The projecting ends of the brackets 11 are rigidly attached to a supporting and guide plate 14 located in the chamber 7. The supporting and guide plate 14 carries a plurality of grooved rollers 15 on its rear face which rollers engage guide rods 16 extending between the base plate 8 and a bracket 19 carried by the upper portion of the wall 6.

The supporting carriage 14 is connected at each side by means of pivoted links 20 to the opposite side arms 21 of a toast carriage actuating lever. The arms 21 project through vertical slots 22 in opposite lateral sides of the wall 6. As shown most clearly in Figure 1, the rear end of the arms 21 are pivoted to the partition plate 5 as indicated at 24. The front ends of the arms 21 curve together generally following the inside curvature of the shell 2 joining at approximately the center line of the toaster 25 at which point they pass through a slot 26 in the shell 2 and support a manual actuating handle 27 adjacent the exterior wall of the casing 2.

A tension spring 28 is connected at one end to a tongue 29 on the bracket 19 and at its opposite end, not shown, to the joined portion of the levers 21 so as to urge the levers 21, the guide plate 14 and the toast supporting rack 10 into upper, toast ejecting position.

A latch tongue 32 is turned outwardly from the plate 14 in position to engage under and be secured by a latch lever 33. The latch lever is mounted upon a shaft 34 which is pivoted upon the upper end of a bracket 35 secured to the base plate 8. A tension spring 36 is secured between a rigid projection 37 on the shaft 34 and an anchor 38 secured to the base plate 8. The tension spring 36 tends to rotate the latch 33 in a clockwise direction, as viewed in Figure 2, into position to latch over and secure the latch tongue 32. The lower end of the latch 33 is connected by means of a tension link 40 to the outer free end of a curved lever 41 pivoted to the base plate 8 at 42. Clockwise rotation of the latch 33 and counter-clockwise rotation of the connected lever 41 under the bias of the spring 36 is limited by engagement between a projection 44 on the lever 41 and a fixed stop 45 mounted upon the base plate 8.

The latch mechanism is actuated by a thermostatic timing mechanism which comprises a spiral bimetallic element 50 rigidly attached at its inner end to a collar 51 rotatably mounted upon a fixed upstanding post 52 which is secured to the base plate 8. A brake wheel 53 and a cam 54 are also rigidly attached to the rotatable collar 51. The peripheral edge of the brake drum 53 is engageable by a brake band 55 one end of which is anchored at 56 to the base plate 8 and the other end of which is pivotally connected to a lever 57 which is pivotally mounted upon a bracket 58 secured to the base plate 8 of the toaster. The lever 57 carries an upstanding cam bar 59 adapted to be engaged by a tongue 60 struck out from the plate 14. These parts are so positioned that when the toast carriage mechanism is latched down in toasting position the tongue 60 has engaged the cam bar 59 to rotate the lever 57 in a counter-clockwise direction thus tightening the brake band 55 about the drum 53 and preventing rotation thereof. A tension spring 61 is connected between the cam bar 59 and a spaced point on the bracket 58 to urge the lever 57 in a clockwise direction tending to release the brake band 55.

Figure 2:
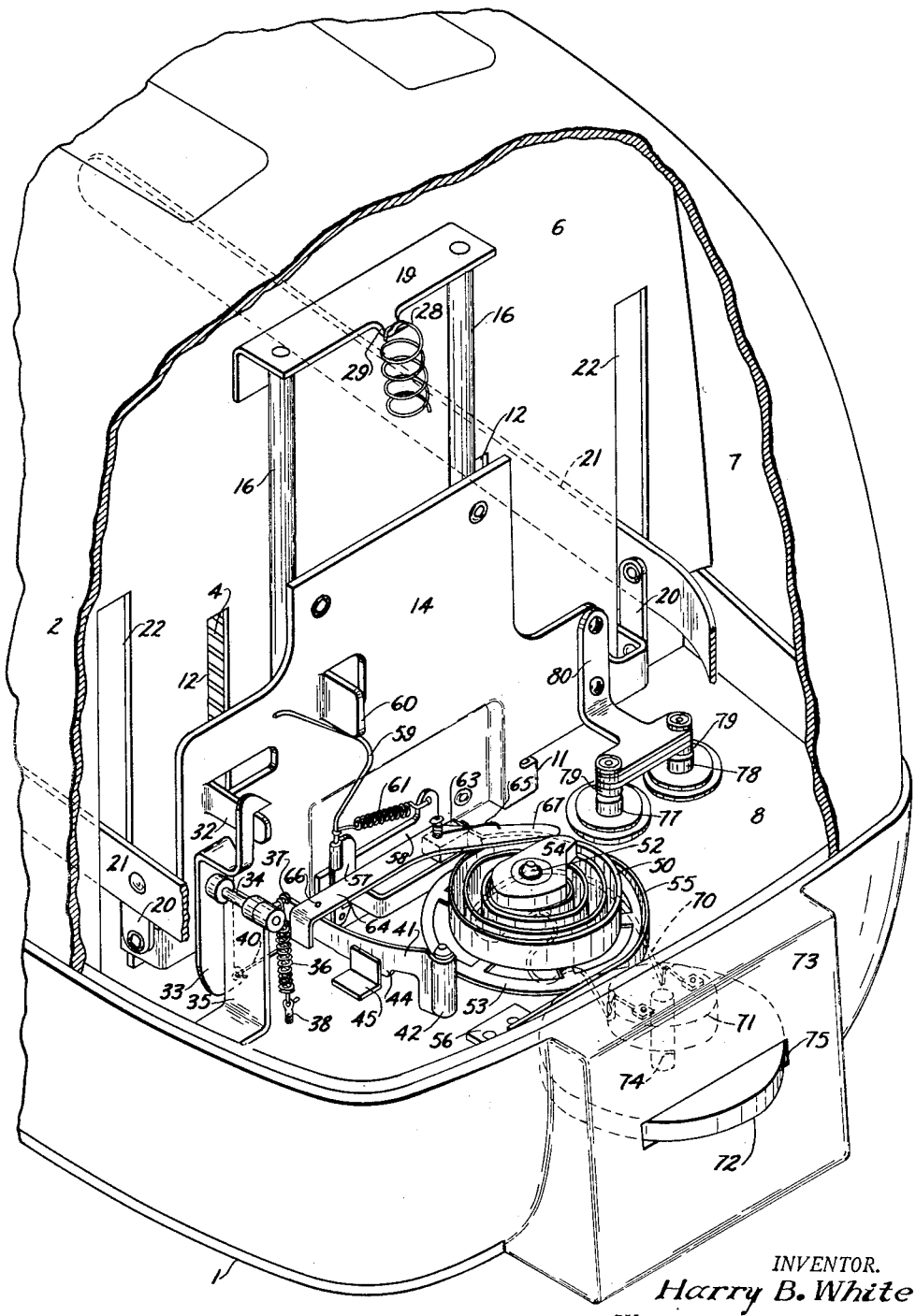
Figure 2 is a perspective end elevational view of the toaster embodying the present invention with parts broken away to show the interior construction.
Figure 3:
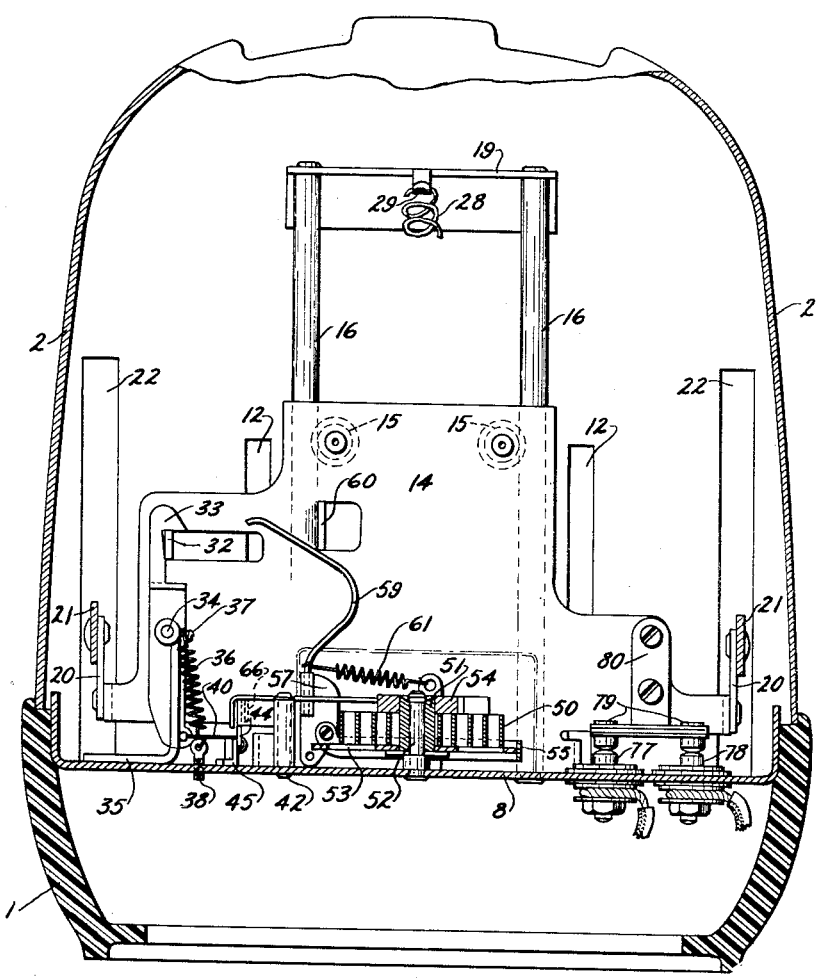
Figure 3 is a sectional elevational view taken substantially along the line 3—3 of Figure 1 looking in the direction of the arrows.

The free end of the spiral bimetallic element 50 carries a bearing block 63 upon which is pivotally mounted a bell crank lever 64 urged to rotate in a clockwise direction, as viewed in Figure 2, by a torsion spring 65. One end of the bell crank lever 64 is bent over to engage the far face of the lever 41. A pin 66 carried by the lever 64 engages the near face of the lever 41 to allow pivotal movement of the lever 64 with respect to the lever 41 without permitting disengagement therebetween.

The lever 41 is curved about the point occupied by the pivot 63 of the bell crank 64 when the projection 44 engages the stop 45.

The leg 67 of the bell crank lever 64 engages the cam 54 which is fixedly attached to the bearing collar 51 for rotation with the inner end of thermostat 50.

Figure 4:
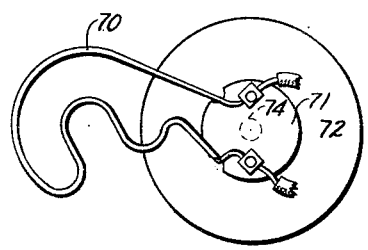
Figure 4 is a detailed view of an auxiliary heating element.

The brake wheel 53 is in the form of a spider wheel and overlies a sinuous electrical resisting heating element 70, see Figure 4, secured at its ends to an insulating block 71 which is carried by a large manual adjusting dial 72. These elements are housed in a box-like projection 73 on the front end of the base structure 1 of the toaster. The elements 70 to 72 are pivotally mounted upon a shaft 74 secured in any desired manner within the casing 73. In the position shown the heating element 70 extends into the space between the base plate 8 of the toasting apparatus and the spider brake wheel 53 so that radiant heat therefrom impinges directly to the spiral bimetallic element 50. If desired mica sheets, not shown, can be secured upon the upper portion of the base plate 8 and the under surface of the wheel 53 to prevent accidental electrical connection between the base plate 8 or the wheel 53 and the heating element 70. The adjusting dial 72 extends through a slot 75 in the front wall of the box extension 73 where that wheel can be engaged by the operator of the toaster and rotated to rotate the heating element 70 and change its position relative to the bimetallic element 50. This alters the rate at which heat is applied to the bimetallic element and provides the means by which the color of the toast can be controlled at will.

The electrical circuit for the apparatus includes a pair of electrical contacts 77 and 78 mounted upon but insulated from the base plate 8. A bridging contact 79 is carried by a bracket 80 which is secured to the toast carriage guide plate 14. When the carriage structure 14 is lowered to latched position for toasting operation the contact 79 completes the electrical circuit between the contacts 77 and 78. The electrical connections beyond this point have been omitted for clarity of illustration. They are as follows: The contact 78 is connected to one of the supply leads. The contact 77 is connected to the heating elements 4 and 70 and the other ends of each of these elements are then connected to the other supply line, that is, the heating elements are parallel connected with respect to each other and the parallel connected heating elements are in series with the switching elements 77 and 78 so that they are both energized when the toast carriage is in lowered latched position and are both de-energized when the latch is released and the spring 28 raises the toast carriage to upper toast ejecting position.

The operation of the device is as follows: Assuming that the toaster has not been operated for a period of time sufficient to allow all portions thereof to reach room temperature the parts will be substantially in the position illustrated in Figure 2 immediately after the toast carriage is lowered to latched position. Under these conditions the engagement between the tongue 60 and cam rod 59 has set the brake band 55 to prevent rotation of the wheel 53, inner end of thermostat 50 and cam 54. Heat is now applied to the thermostat by the heating element 70 which causes the thermostat to uncoil in a clockwise direction thus pulling the lever 64 to the right as viewed in Figure 2 rotating the arm 41 in a clockwise direction which in turn rotates the latch 33 in a counter-clockwise direction against the bias of the spring 36 to release the latch tongue 32 and terminate the toasting period. As is customary for toasting apparatuses the first period starting with the toaster at room temperature condition is comparatively very long, however, at the end of this first toasting period the ambient within the toasting oven is at a raised value compared to room temperature as is the temperature of the thermostat 50. Immediately the toast carriage is released the brake band 55 is released from the wheel 53 thus allowing the wheel 53, thermostat 50 as a whole and cam 54 to rotate as a unit about the pivot posts 52. As soon as the brake band is released the tension spring 36 restores the latch 33 to latching position and swings the arm 41 in a counter-clockwise direction against the stop 45. As the thermostat is hot and heat stressed when the brake band is released the inner end of the thermostat rotates the cam 54 to relieve the heat stress. Since the free end of the thermostat 50 is held in its fixed starting position, the collar 51 and its associated parts have, in effect, rotated in a counter-clockwise direction. Rotation of cam 54 rotates the bell crank 64 in a counter-clockwise direction and causes the end thereof to move along the curved lever 41 inwardly toward its pivot point 42. Movement of the end of the bell crank 64 along the lever 41 toward the pivot 42 changes the mechanical relation between the free end of the thermostat 50 and the latch 33 by requiring a lesser clockwise motion of the thermostat to produce a given motion in the latch 33 sufficient to disengage the same from the latch tongue 32. This motion of the bell crank 64 along lever 41 does not impart motion to lever 41 because it is curved about the pivot of the bell crank 64 as a center. The foregoing internal movement of the thermostat and shifting of the cam 54 proceeds in the interval between toasting periods to provide a constant compensation for the toaster ambient.

If sequential toasting cycles follow each other closely so that the toaster ambient is progressively higher at the start of succeeding cycles the thermostat heats to higher and higher temperatures because of its initial high temperature. The increasing temperature of the thermostat also progressively changes the linkage to require smaller and smaller degrees of thermostat movement to actuate the release latch.

If the toasting periods are initiated in closely succeeding relation, the above described sequence of events continues for each toasting period until the oven temperature reaches equilibrium, that is, succeeding toasting periods require uniform time periods. When this condition is reached the arm 64 has moved in close to the pivot 42 of the arm 41. A very small clockwise movement of the thermostat 50 is sufficient to actuate the latch 33 to release the toast carriage. On the other hand the thermostat is at an elevated temperature so that the extent to which the heating element can increase the thermostat temperature per unit of time is small. The temperature of the thermostat is so high that it decreases very rapidly immediately the element 70 is de-energized. Under these conditions the thermostat will require 40 seconds, for example, to be heated sufficiently to deflect the small amount required to release the latch 33, however, it will cool through the range at which it was previously heated very rapidly, say 6 to 7 seconds, therefore the heating and cooling range and range of movement of the thermostat are exactly repeated for succeeding toasting cycles, that is, a condition of equilibrium has been achieved and toast of uniform color is produced each time the toaster is operated. The foregoing is of course subject to the qualifications that the operator has not changed the adjustment of the auxiliary heater 70. Whatever adjustment the operator may place upon this effects only the color of the toast or the degree of brownness thereof and changes all heating cycles in proportionate degrees.

The present invention provides a construction in which the operating portion of the thermostat always begins its timing motion from a substantially fixed point and in which closely succeeding toasting periods are shortened to compensate for the progressively increasing oven temperature by shortening the degree of movement required of the thermostat to time a toasting period. The thermostat mechanism ultimately reaches a condition in which the bimetal is functioning on the edge of an equilibrium condition with its heating element, that is, the heating element is able to supply heat to increase the temperature of the bimetal only to a slight degree because of the high heat rejection rate from the high temperature bimetal. Under such circumstances the degree of movement which can be achieved by the bimetal is small, hence the high multiplication of movement at this time provided by the variable linkage through the action of the movable bell crank 64 and multiplying lever 41.

Though only a single modification of the invention has been illustrated and described herein it will be obvious to those skilled in the art that the principles involved in the instant invention can be embodied in numerous structural exemplifications without departing from the conception of the invention or the basic principles thereof. For example, the principles of the present invention can be utilized without the intervention of a variable ratio linkage by altering the arc of movement of the securing latch 33. That is, the latch must take a full arc of movement before it releases for the long time early toasting period and will move through only a short arc of movement to release the carriage for a short time period of toasting. This can be accomplished by a cam rotatable from the inner end of the thermostat which changes the position of the stop for the operating end of the thermostat and the release latch. With such a construction the starting position of the thermostat and its arc of operating movement are both changed to compensate for the toaster ambient. This also alters the degree of bite of the release latch on the toast carriage latch keeper.

While I have illustrated and described the invention in considerable detail, it is to be understood that various changes may be made in the arrangement, proportion and construction of parts without departing from the spirit of the invention or the scope of the appended claims.

I claim:

1. Timing mechanism comprising a thermostat, means for heating said thermostat, means biasing one part of said thermostat to a fixed position, starting means for energizing said heating means and for securing another part of said thermostat against movement, terminating mechanism for releasing said another part of said thermostat and for de-energizing said heating means, means connecting said one part of said thermostat to said terminating mechanism to operate said terminating mechanism by heat induced movement of said one part of said thermostat, said connecting means including a pivoted link having a free end connected to said terminating mechanism, a drive link connected at one end to be moved by said one part of said thermostat and to move with respect thereto, the other end of said drive link being connected to said pivoted link to transmit movement of said one part of said thermostat thereto and to move freely with respect to said pivoted link without moving the same in a direction at an angle to the direction of movement produced by said thermostat to vary the degree of movement required by said one part of said thermostat to produce a fixed degree movement of said pivoted link, and means operated by said another part of said thermostat when released from the restraint of said starting means for imparting such movement at an angle to said second mentioned link.

2. In a toaster timer, timing operation initiating means biased to an inoperative position, means for moving said initiating means to operative position, a latch for retaining said initiating means in operative position, a thermostat, an arcuate link pivoted at one end and operatively connected to said latch at its other end, a drive arm slidably connected to said arcuate link, means connecting said drive arm to said one end of said thermostat for translatory movement thereby to actuate said arcuate link and mounting said arm for pivotal movement whereby to change its effective point of connection to said arcuate link without actuating the same, lock means biased to an inoperative condition for securing another part of said thermostat in fixed position, means operated by said initiating means for operating said locking means to secure said another part of said thermostat in fixed position when said initiating means is in said operative position, means connecting said another part of said thermostat to said pivoted arm to pivot said arm with respect to said arcuate link, and means biasing said one part of said thermostat to a fixed position.

3. A timer comprising a thermostat, a heater for said thermostat, a movable support for said thermostat, said thermostat having one part thereof secured to said support and a free part, means biasing said thermostat and said support to move said free part of said thermostat to a fixed position, means for energizing said heater and for securing said support immovably to initiate a timing operation, terminating means for de-energizing said heater and for releasing said support securing means to terminate a timing operation, a motion transmitting mechanism connected to transmit heat induced movement of said free part of said thermostat to said terminating means to operate the same, said motion transmitting mechanism including means for varying the mechanical connections of parts of said mechanism to vary the ratio of motion applied thereto by said free part of said thermostat to the motion applied thereby to said terminating means, and means operated by said one part of said thermostat for operating said motion ratio varying means.

4. Timing mechanism comprising a thermostat, means for heating said thermostat, resilient means for moving said thermostat to place one part thereof in a fixed position, means for energizing said heating means and for securing another part of said thermostat in fixed position to initiate a timing operation, timing operation terminating means for de-energizing said heating means and for releasing said another part of said thermostat, a linkage connected to transmit heat induced operating movement of said one part of said thermostat to said terminating means to terminate a timing operation, said linkage including a pivoted lever and a drive lever connected to impart a rocking motion to said pivoted lever when said linkage is actuated by said thermostat, and means operated by heat induced movement of said another part of said thermostat for changing the point of connection between said levers to vary the motion required of said one part of said thermostat to actuate said terminating means.

5. In a timer, a thermostat, a heater for said thermostat, energizing means for said heater movable between heater energizing and de-energizing positions, means biasing said energizing means to heater de-energizing position, a latch for retaining said energizing means in heater energizing position, a linkage means connected to said thermostat to be operated by heat induced deformation of said thermostat for releasing said latch to terminate a timing operation, means for varying the connections between parts of said linkage to vary the amount of deformation of said thermostat required to release said latch, means connected to said thermostat to be operated thereby for actuating said linkage varying means, and means operated by said energizing means in heater energizing position for blocking operation of said varying means.

6. In a timer, a thermostat, a heater arranged to heat said thermostat, means for de-activating said heater to terminate a timing operation, a motion transmitting mechanism connected to said heater de-activating means and to said thermostat to actuate said heater de-activating means in response to heat induced deformation of said thermostat, said motion transmitting mechanism including adjusting means for changing the mechanical connections between parts thereof to vary the amount of deformation of said thermostat required to actuate said heater de-activating means, means connected to said thermostat to be actuated by heat induced deformation thereof for actuating said adjusting means, and means for activating said heater and for securing said means for actuating said adjusting means against operation to initiate a timing operation.

7. A timer comprising a thermostat, a heater for heating said thermostat, means operative when actuated for de-activating said heater to terminate a timing operation, motion transmitting means for transmitting motion produced by heat induced deformation of said thermostat to said de-activating means to actuate the same, said motion transmitting mechanism including adjusting means for varying the effective driving connections between parts thereof to vary the amount of heat induced deformation of said thermostat required to actuate said de-activating means, means operated by heat induced deformation of said thermostat for operating said adjusting means, and means for activating said heater and for rendering said adjusting means inoperative to initiate a timing operation.

8. In a timer, a thermostat, a heater for said thermostat, mechanism for de-energizing said heater in response to a heat induced deformation of said thermostat including a linkage connected to be actuated by said thermostat, adjusting means for changing the operating connections between parts of said linkage to vary the amount of heat induced deformation of said thermostat required to de-energize said heater, means connected to said thermostat to be operated thereby for actuating said adjusting means, and means for rendering said adjusting means inoperative and for energizing said heater to initiate a timing operation.

9. In a timer, a thermostat, mechanism to be actuated by said thermostat to terminate a timing operation in response to a heat induced deformation of said thermostat including a motion transmitting linkage connected to said thermostat to be actuated thereby, adjusting means for changing the operating connections between parts of said linkage to vary the amount of deformation of said thermostat required to actuate said mechanism, means connected to said thermostat to be operated thereby for actuating said adjusting means, and means for holding said adjusting means inoperative to initiate a timing operation, said mechanism including means for releasing said means for holding said adjusting means when said mechanism is actuated by said thermostat.

10. In a timer, a mechanical train comprising a thermostat, a member to be operated by said thermostat at the termination of a timing operation, means for transmitting motion produced by a heat induced deformation of said thermostat to said member to operate the same, and means for altering the operating position of one part of said train relative to another part thereof for varying the amount of heat induced deformation of said thermostat required to operate said member, means operated by said thermostat for actuating said altering means, means for rendering said last mentioned means inoperative during a timing operation, and means for releasing said altering means when said member is operated.

11. A timing device comprising, a thermostat, a heater arranged to heat said thermostat, means for de-energizing said heater; mechanism for actuating said de-energizing means in response to a heat induced deformation of said thermostat to terminate a timing operation including a pivotally mounted member, a drive member for imparting pivotal movement to said pivotally mounted member, means providing a driving connection between said thermostat and said drive member, means providing a driving connection between said pivotally mounted member and said drive member adjustable to change the effective distance between the pivotal axis of said pivotally mounted member and the point of connection of said drive member to said pivotally mounted member, means connected to said thermostat to be operated by heat induced deformation thereof for adjusting said driving connection of said drive member to said pivotally mounted member, means for energizing said heater and for holding said driving connection adjusting means inoperative to initiate a timing operation, said mechanism including means for releasing said means for holding said driving connection adjusting means when said mechanism actuates said de-energizing means.

HARRY B. WHITE.

REFERENCES CITED

The following references are of record in the file of this patent:

UNITED STATES PATENTS

| Number | Name | Date |
|---|---|---|
| 1,795,013 | Denmann | Mar. 3, 1931 |
| 2,031,656 | Jeppsson | Feb. 26, 1936 |
| 2,179,811 | Brosseau | Nov. 14, 1939 |
| 2,250,997 | Miller | July 29, 1941 |
| 2,254,687 | Koci | Sept. 2, 1941 |
| 2,269,162 | Newell | Jan. 6, 1942 |
| 2,271,485 | Koci | Jan. 27, 1942 |
| 2,436,735 | Walder et al. | Feb. 24, 1948 |